(12) United States Patent
Donnell et al.

(10) Patent No.: US 11,941,546 B2
(45) Date of Patent: Mar. 26, 2024

(54) METHOD AND SYSTEM FOR GENERATING AN EXPERT TEMPLATE

(71) Applicant: Gravystack, Inc., Phoenix, AZ (US)

(72) Inventors: Scott Donnell, Phoenix, AZ (US); Travis Adams, Phoenix, AZ (US); Chad Willardson, Phoenix, AZ (US)

(73) Assignee: Gravystack, Inc., Phoenix, AZ (US)

( * ) Notice: Subject to any disclaimer, the term of this patent is extended or adjusted under 35 U.S.C. 154(b) by 0 days.

(21) Appl. No.: 17/872,982

(22) Filed: Jul. 25, 2022

(65) Prior Publication Data

US 2024/0037428 A1 Feb. 1, 2024

(51) Int. Cl.
*G06N 5/048* (2023.01)
*G06N 5/022* (2023.01)
*G06N 20/00* (2019.01)
*G06Q 50/10* (2012.01)

(52) U.S. Cl.
CPC ............ *G06N 5/048* (2013.01); *G06N 5/022* (2013.01); *G06N 20/00* (2019.01); *G06Q 50/10* (2013.01)

(58) Field of Classification Search
CPC ......... G06N 5/022; G06N 20/00; G06Q 50/10
See application file for complete search history.

(56) References Cited

U.S. PATENT DOCUMENTS

| | | |
|---|---|---|
| 8,484,181 B2 | 7/2013 | Levin |
| 10,874,947 B2 | 12/2020 | Benedetto |
| 2012/0005148 A1* | 1/2012 | Horvitz ................. G06N 20/00 706/50 |
| 2014/0133758 A1* | 5/2014 | Kienzle ............... G06V 10/446 382/195 |
| 2015/0317376 A1* | 11/2015 | Bauer .................. G06F 16/285 707/737 |
| 2017/0206797 A1* | 7/2017 | Solomon ................ G06N 3/006 |
| 2018/0165604 A1* | 6/2018 | Minkin ................. G06Q 10/06 |
| 2020/0410427 A1 | 12/2020 | Haze |
| 2021/0125108 A1* | 4/2021 | Metzler, Jr. ............. G06F 16/93 |
| 2021/0174307 A1* | 6/2021 | Upadhyay ........ G06Q 10/06398 |
| 2021/0270797 A1* | 9/2021 | Cheim ............... G01N 21/3504 |
| 2022/0237409 A1* | 7/2022 | Zhang .................. G06F 18/214 |
| 2022/0353226 A1* | 11/2022 | Evans .................. H04L 51/214 |

FOREIGN PATENT DOCUMENTS

WO WO-2021123742 A1 * 6/2021 ......... G06F 16/3338

OTHER PUBLICATIONS

Bifulco I, Cirillo S, Esposito C, Guadagni R, Polese G. An intelligent system for focused crawling from Big Data sources. Expert Systems with Applications. Dec. 1, 2021;184:115560. (Year: 2021).*

* cited by examiner

*Primary Examiner* — Oluwatosin O Alabi
(74) *Attorney, Agent, or Firm* — Caldwell Intellectual Property Law

(57) ABSTRACT

The invention is direct towards generating an expert template. The expert template is associated with an expert who can help guide a user. A user is associated with user goal data and a user goal. A user goal is an objective that the user wants to complete. A user is matched with an expert that matches the expert's field of expertise with the user's goals. An expert may provide input to the user regarding guidance and goals.

20 Claims, 7 Drawing Sheets

METHOD AND SYSTEM FOR GENERATING AN EXPERT TEMPLATE

FIELD OF THE INVENTION

The present invention generally relates to the field of cryptography. In particular, the present invention is directed to generating an expert template.

BACKGROUND

Experts are often not matched up with the right users. There is a need for an expert template that can be more accurately matched with a user in need.

SUMMARY OF THE DISCLOSURE

In an aspect an apparatus for generating an expert template includes at least a processor, and a memory connected to the at least a processor, the memory containing instructions configuring the processor to generate an expert template, receive user goal data, receive expert data and classify the user to an expert as a function of the user goal data and expert data.

In another aspect a method for generating an expert template, receiving user goal data, receiving expert data, and classifying the user to an expert as a function of the user goal data and the expert data.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for generating an expert template. The memory contains instructions configuring the processor to generate an expert template. In an embodiment, expert data is matched to user goal data using the user's goals and the expert's field of expertise.

Aspects of the present disclosure can be used to match an expert with a user, where the expert may be able to input goals and guidance for the user to view. This is so, at least in part, because the expert's field of expertise can align with the user's goals, such that additional input from the expert could help the user achieve the goal.

Aspects of the present disclosure allow for F. Exemplary embodiments illustrating aspects of the present disclosure are described below in the context of several specific examples.

Figure 1:
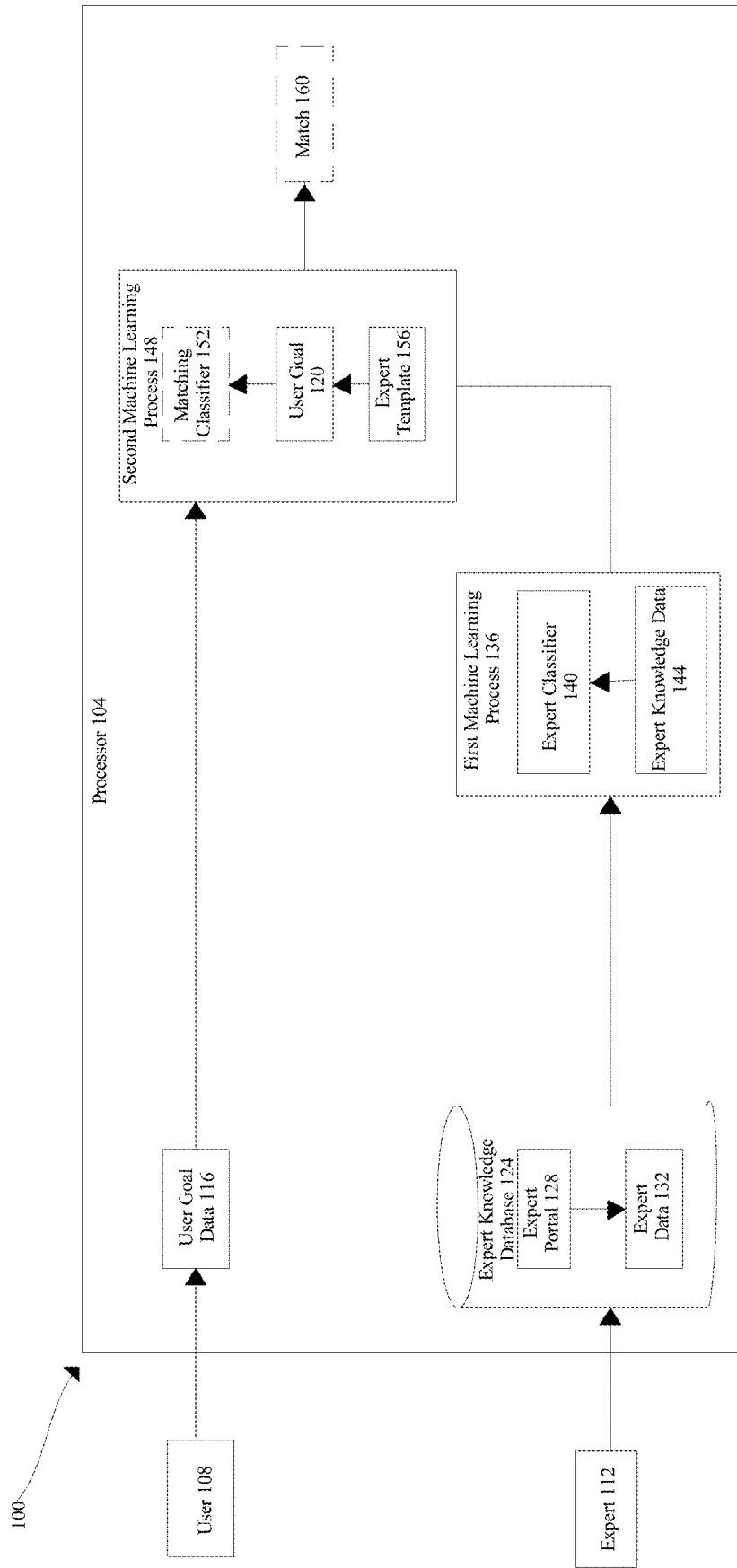
FIG. 1 is a block diagram illustrating a method generating an expert template.

Referring now to FIG. 1, an exemplary embodiment of an apparatus for generating an expert template is illustrated. System includes a processor 104. Processor 104 may include any computing device as described in this disclosure, including without limitation a microcontroller, microprocessor, digital signal processor (DSP) and/or system on a chip (SoC) as described in this disclosure. Processor 104 may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of system 100 and/or computing device.

With continued reference to FIG. 1, Processor 104 may be designed and/or configured to perform any method, method step, or sequence of method steps in any embodiment described in this disclosure, in any order and with any degree of repetition. For instance, Processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Continuing reference to FIG. 1, apparatus 100 receives user goal data 116 identifying a task attribute. User goal data 116 may be transmitted to apparatus 100 by user 108. For example, user 108 may upload user goal data 116 to processor 104. A user may use a device such as a smart phone, tablet, laptop, or the like to upload user goal data 116 to processor 104. "User goal data" as used herein, is data relating to a user's goals. A "goal" as used herein is an object of a user's ambition or effort. Non-limiting examples of a user's goals may include learning calculus, joining a marketing team, learning Spanish, and the like. User goal data 116 may include audiovisual data. "Audiovisual data" is information stored as a multimedia file. Audiovisual data may include text, voice memos, videos, photos, audio, or the like. "Task attribute" is a feature of a task. In an embodiment, task attribute may include the completion of a task. As used herein, a "task" is a piece of work to be done. Non-limiting examples of user tasks may be mathematics quizzes, website models, audio recordings of Spanish phrases, and the like. User goal data 116 may relate to a user's activities on an online platform. User goal data 116 may include information relating to a user's progress or activity throughout an online platform. For example, user goal data 116 may include answers to homework questions such as math problem sets, essays, or the like, completed tasks, tasks assigned by an online platform, etc. Tasks may include completion of a game on an online platform, completion of a chore, or the like. Game may include games to improve personal weaknesses, financial literacy, or the like. For example, the task in the game may include asking a user to tally all the subscription services the user may have. In another embodiment, the task may include asking a user to design a logo for a company, to improve their graphic design skills. User goal data 116 may include a document containing answers to a homework problem set and/or task, a picture of a completed chore, such as a picture of the dishes cleaned, a video of a successful soccer maneuver that the user had been struggling with, or the like.

Continued reference to FIG. 1, apparatus 100 receives a user goal 120 identifying an objective that user 108 wants to complete. User goal 120 may be transmitted to apparatus 100 through information obtained from user goal data 116. For example, user goal data 116 may include many tasks attributes relating to the study of algebra, therefore, user goal 120 may be to master the subject of algebra or another advanced mathematics course. "User goal" as used herein, is an objective that the user wants to complete. In a non-limiting embodiment, a user goal may be not limited to personal or professional relationships. A user goal may encompass any space in a user's life, whether its developing social skills to use in a professional setting or a social setting or developing mathematics efficiency to use in an education setting or a business setting, or the like. A user goal may be selected by the user based on their own objectives, or in a non-limiting embodiment, a professor, boss, or other authoritative figure may assign a goal for the user to engage with. In a non-limiting embodiment, there may be no time limit that the user must complete the associated tasks by. However, in some embodiments, there still may be a time limit enforced on a goal if the user chooses or if a professor, boss or other authoritative figure decides to add a time limit for task completion. User goal 120 may include obtaining an undergraduate degree in biology, learning financial literacy, improving a personal weakness, or the like. In another embodiment, a user goal may be to learn another language, improve graphic design skills, learn how to sew, or the like. Additional disclosure related to goal selection and skill selection may be found in U.S. patent application Ser. No. 17/872,910, filed on Jul. 25, 2022, and entitled "APPARATUS FOR ATTRIBUTE PATH GENERATION," the entirety of which is incorporated herein by reference.

Continuing reference to FIG. 1, user goal 120 may pertain to a subsequent skill. As used herein, a "subsequent skill" refers to a skill that a user has gained following engagement with a prior skill or goal. In a non-limiting example, a user has the original goal of wanting to learn Calculus. Through developing skills to master calculus, the user also engaged with some tasks that involved statistics. Proficiency in statistics could be referred to as a subsequent skill that was developed while developing skills in Calculus. Subsequent skills may be related to the original user goal. Subsequent skills may be consistent with the term "subsequent goals." The term "subsequent goals" as used herein, refers to goals that develop from engaging with the original user goal. For additional disclosure related to subsequent skills may be found in U.S. patent application Ser. No. 17/872,182, filed on Jul. 25, 2022, entitled "APPARATUS FOR ATTRIBUTE TRAVERSAL," the entirety of which is incorporated herein by reference.

Referencing FIG. 1, user goal 120 may pertain to a strength that the user has developed or wants to develop. As used herein, a "strength" refers to an attribute that the user has established a level of proficiency with. In a non-limiting example, strengths may refer to educational abilities, vocational abilities, pecuniary abilities, musical abilities, and the like. In a non-limiting embodiment, a user may demonstrate strengths in deadlifting, squatting, or benching. These strengths may relate or prompt a user's goal to lift heavier weights or enter a weightlifting competition. Additional disclosure related to goals related to strengths may be found in U.S. patent application Ser. No. 17/872,857, filed on Jul. 25, 2022, entitled "APPARATUS AND METHODS FOR ANALYZING STRENGTHS," the entirety of which is incorporated herein by reference.

Refencing FIG. 1, user goal 120 may pertain to a deficiency that the user has demonstrated. As used herein, a "deficiency" refers to an attribute that the use has established a level of weakness with. In a non-limiting example, deficiencies may refer to educational deficiencies, vocational deficiencies, pecuniary deficiencies, musical deficiencies, and the like. In a non-limiting embodiment, a user may demonstrate deficiencies related to understanding algebraic functions. These deficiencies may relate to the user's inability to isolate a variable or understand complex equations. A possible user goal that could stem from this deficiency could be to learn how to isolate variables in complex algebraic equations. Additional disclosure related to goals related to deficiencies may be found int U.S. patent application Ser. No. 17/872,950, filed on Jul. 25, 2022, entitled "APPARATUS AND METHODS FOR ANALYZING DEFICIENCIES," the entirety of which is incorporated herein by reference.

Continuing to reference FIG. 1, apparatus 100 is configured to parse user goal data 116, for instance to identify task attribute. In some embodiments, processor 104 may transcribe much or even substantially all verbal content from audiovisual data, such as a video or a voice memo, or the like. Processor 104 may transcribe verbal content by way of speech to text or speech recognition technologies. Exemplary automatic speech recognition technologies include, without limitation, dynamic time warping (DTW)-based speech recognition, end-to-end automatic speech recognition, hidden Markov models, neural networks, including deep feedforward and recurrent neural networks, and the like. Generally, automatic speech recognition may include any machine-learning process described in this disclosure, for example with reference to FIGS. 2-4.

Still referring to FIG. 1, in some embodiments, automatic speech recognition may require training (i.e., enrollment). In some cases, training an automatic speech recognition model may require an individual speaker to read text or isolated vocabulary. Processor 104 may then train an automatic speech recognition model according to training data which includes verbal content correlated to known content. In this way, processor 104 may analyze a person's specific voice and train an automatic speech recognition model to the person's speech, resulting in increased accuracy. Alternatively or additionally, in some cases, processor 104 may include an automatic speech recognition model that is speaker-independent. As used in this disclosure, a "speaker independent" automatic speech recognition process does not require training for each individual speaker. Conversely, as used in this disclosure, automatic speech recognition processes that employ individual speaker specific training are "speaker dependent."

Still referring to FIG. 1, in some embodiments, an automatic speech recognition process may perform voice recognition or speaker identification to ensure that the speaker is the user. As used in this disclosure, "voice recognition" refers to identifying a speaker, from user goal data 116, rather than what the speaker is saying. In some cases, processor 104 may first recognize a speaker of user goal data 116 and then automatically recognize speech of the speaker, for example by way of a speaker dependent automatic speech recognition model or process. In some embodiments, an automatic speech recognition process can be used to authenticate or verify an identity of a speaker.

Still referring to FIG. 1, in some embodiments, an automatic speech recognition process may include one or all of acoustic modeling, language modeling, and statistically-based speech recognition algorithms. In some cases, an automatic speech recognition process may employ hidden Markov models (HMMs). As discussed in greater detail below, language modeling such as that employed in natural language processing applications like document classification or statistical machine translation, may also be employed by an automatic speech recognition process.

Still referring to FIG. 1, an exemplary algorithm employed in automatic speech recognition may include or even be based upon hidden Markov models. Hidden Markov models (HMMs) may include statistical models that output a sequence of symbols or quantities. HMMs can be used in speech recognition because a speech signal can be viewed as a piecewise stationary signal or a short-time stationary signal. For example, over a short time scale (e.g., 10 milliseconds), speech can be approximated as a stationary process. Speech (i.e., audible verbal content) can be understood as a Markov model for many stochastic purposes.

Still referring to FIG. 1, in some embodiments HMMs can be trained automatically and may be relatively simple and computationally feasible to use. In an exemplary automatic speech recognition process, a hidden Markov model may output a sequence of n-dimensional real-valued vectors (with n being a small integer, such as 10), at a rate of about one vector every 10 milliseconds. Vectors may consist of cepstral coefficients. A cepstral coefficient requires using a spectral domain. Cepstral coefficients may be obtained by taking a Fourier transform of a short time window of speech yielding a spectrum, decorrelating the spectrum using a cosine transform, and taking first (i.e., most significant) coefficients. In some cases, an HMM may have in each state a statistical distribution that is a mixture of diagonal covariance Gaussians, yielding a likelihood for each observed vector. In some cases, each word, or phoneme, may have a different output distribution; an HMM for a sequence of words or phonemes may be made by concatenating an HMMs for separate words and phonemes.

Still referring to FIG. 1, in some embodiments, an automatic speech recognition process may use various combinations of a number of techniques in order to improve results. In some cases, a large-vocabulary automatic speech recognition process may include context dependency for phonemes. For example, in some cases, phonemes with different left and right context may have different realizations as HMM states. In some cases, an automatic speech recognition process may use cepstral normalization to normalize for different speakers and recording conditions. In some cases, an automatic speech recognition process may use vocal tract length normalization (VTLN) for male-female normalization and maximum likelihood linear regression (MLLR) for more general speaker adaptation. In some cases, an automatic speech recognition process may determine so-called delta and delta-delta coefficients to capture speech dynamics and might use heteroscedastic linear discriminant analysis (HLDA). In some cases, an automatic speech recognition process may use splicing and a linear discriminate analysis (LDA)-based projection, which may include heteroscedastic linear discriminant analysis or a global semi-tied covariance transform (also known as maximum likelihood linear transform [MLLT]). In some cases, an automatic speech recognition process may use discriminative training techniques, which may dispense with a purely statistical approach to HMM parameter estimation and instead optimize some classification-related measure of training data; examples may include maximum mutual information (MMI), minimum classification error (MCE), and minimum phone error (MPE).

Still referring to FIG. 1, in some embodiments, an automatic speech recognition process may be said to decode speech (i.e., audible verbal content). Decoding of speech may occur when an automatic speech recognition system is presented with a new utterance and must compute a most likely sentence. In some cases, speech decoding may include a Viterbi algorithm. A Viterbi algorithm may include a dynamic programming algorithm for obtaining a maximum a posteriori probability estimate of a most likely sequence of hidden states (i.e., Viterbi path) that results in a sequence of observed events. Viterbi algorithms may be employed in context of Markov information sources and hidden Markov models. A Viterbi algorithm may be used to find a best path, for example using a dynamically created combination hidden Markov model, having both acoustic and language model information, using a statically created combination hidden Markov model (e.g., finite state transducer [FST] approach).

Still referring to FIG. 1, in some embodiments, speech (i.e., audible verbal content) decoding may include considering a set of good candidates and not only a best candidate, when presented with a new utterance. In some cases, a better scoring function (i.e., re-scoring) may be used to rate each of a set of good candidates, allowing selection of a best candidate according to this refined score. In some cases, a set of candidates can be kept either as a list (i.e., N-best list approach) or as a subset of models (i.e., a lattice). In some cases, re-scoring may be performed by optimizing Bayes risk (or an approximation thereof). In some cases, re-scoring may include optimizing for sentence (including keywords) that minimizes an expectancy of a given loss function with regards to all possible transcriptions. For example, re-scoring may allow selection of a sentence that minimizes an average distance to other possible sentences weighted by their estimated probability. In some cases, an employed loss function may include Levenshtein distance, although different distance calculations may be performed, for instance for specific tasks. In some cases, a set of candidates may be pruned to maintain tractability.

Still referring to FIG. 1, in some embodiments, an automatic speech recognition process may employ dynamic time warping (DTW)-based approaches. Dynamic time warping may include algorithms for measuring similarity between two sequences, which may vary in time or speed. For instance, similarities in walking patterns would be detected, even if in one video the person was walking slowly and if in another he or she were walking more quickly, or even if there were accelerations and deceleration during the course of one observation. DTW has been applied to video, audio, and graphics—indeed, any data that can be turned into a linear representation can be analyzed with DTW. In some cases, DTW may be used by an automatic speech recognition process to cope with different speaking (i.e., audible verbal content) speeds. In some cases, DTW may allow computing device 104 to find an optimal match between two given sequences (e.g., time series) with certain restrictions. That is, in some cases, sequences can be "warped" non-linearly to match each other. In some cases, a DTW-based sequence alignment method may be used in context of hidden Markov models.

Still referring to FIG. 1, in some embodiments, an automatic speech recognition process may include a neural network. Neural network may include any neural network, for example those disclosed with reference to FIGS. 2-4. In some cases, neural networks may be used for automatic speech recognition, including phoneme classification, phoneme classification through multi-objective evolutionary algorithms, isolated word recognition, audiovisual speech recognition, audiovisual speaker recognition and speaker adaptation. In some cases, neural networks employed in automatic speech recognition may make fewer explicit assumptions about feature statistical properties than HMMs and therefore may have several qualities making them attractive recognition models for speech recognition. When used to estimate the probabilities of a speech feature segment, neural networks may allow discriminative training in a natural and efficient manner. In some cases, neural networks may be used to effectively classify audible verbal content over short-time interval, for instance such as individual phonemes and isolated words. In some embodiments, a neural network may be employed by automatic speech recognition processes for pre-processing, feature transformation and/or dimensionality reduction, for example prior to HMM-based recognition. In some embodiments, long short-term memory (LSTM) and related recurrent neural networks (RNNs) and Time Delay Neural Networks (TDNN's) may be used for automatic speech recognition, for example over longer time intervals for continuous speech recognition.

With continued reference to FIG. 1, processor 104 may recognize verbal content not only from speech (i.e., audible verbal content). For example, in some cases, audible verbal content recognition may be aided in analysis of an image. For instance, in some cases, processor 104 may use an image to aid in recognition of audible verbal content as a viewing a speaker (e.g., lips) as they speak aids in comprehension of his or her speech. In some cases, processor 104 may include audiovisual speech recognition processes.

Still referring to FIG. 1, in some embodiments, audio visual speech recognition (AVSR) may include techniques employing image processing capabilities in lip reading to aid speech recognition processes. In some cases, AVSR may be used to decode (i.e., recognize) indeterministic phonemes or help in forming a preponderance among probabilistic candidates. In some cases, AVSR may include an audio-based automatic speech recognition process and an image-based automatic speech recognition process. AVSR may combine results from both processes with feature fusion. Audio-based speech recognition process may analysis audio according to any method described herein, for instance using a Mel-frequency cepstrum coefficients (MFCCs) and/or log-Mel spectrogram derived from raw audio samples. Image-based speech recognition may perform feature recognition to yield an image vector. In some cases, feature recognition may include any feature recognition process described in this disclosure, for example a variant of a convolutional neural network. In some cases, AVSR employs both an audio datum and an image datum to recognize verbal content. For instance, audio vector and image vector may each be concatenated and used to predict speech made by a user, who is 'on camera.'

With continued reference to FIG. 1, in some embodiments, optical character recognition may be used to parse user goal data 116. In some cases, user goal data 116 may be in the form of written or visual verbal content.

Still referring to FIG. 1, in some embodiments, optical character recognition or optical character reader (OCR) includes automatic conversion of images of written (e.g., typed, handwritten or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine-learning processes. In some cases, intelligent word recognition (IWR) may recognize written text, one word at a time, for instance by employing machine-learning processes.

Still referring to FIG. 1, in some cases OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of user goal data 116. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases. a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of user goal data 116.

Still referring to FIG. 1, in some embodiments an OCR process will include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the user goal data 116. Matrix matching may also rely on a stored glyph being in a similar font and at a same scale as input glyph. Matrix matching may work best with typewritten text.

Still referring to FIG. 1, in some embodiments, an OCR process may include a feature extraction process. As used in this disclosure, a "feature" is an individual measurable property or characteristic. In some cases, feature extraction may decompose a glyph into at least a feature. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning process 136 like nearest neighbor classifiers (e.g., k-nearest neighbors algorithm) can be used to compare image features with stored glyph features and choose a nearest match. OCR may employ any machine-learning process 136 described in this disclosure, for example machine-learning processes 136 described with reference to FIGS. 2-4. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. Second pass may include adaptive recognition and use letter shapes recognized with high confidence on a first pass to recognize better remaining letters on the second pass. In some cases, two-pass approach may be advantageous for unusual fonts or low-quality images where visual verbal/written content may be distorted. Another exemplary OCR software tool include OCRopus. OCRopus development is led by German Research Centre for Artificial Intelligence in Kaiserslautern, Germany. In some cases, OCR software may employ neural networks, for example neural networks as taught in reference to FIGS. 2-4.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, user 116 may utilize expert 112 to develop an understanding of user goal 120. An "expert" as used herein, is a person who has comprehensive and authoritative knowledge of or skill in a particular area. An expert may have extensive knowledge or ability based on research, experience, occupation or the like in a particular area of study. Information about the expert's knowledge may be contained within expert knowledge database 124. Within the expert knowledge database 124, there may be an expert portal 128 which may contain expert data 132. An "expert knowledge database" as used herein refers to a structed set of data held in at least a computing system, wherein the structured set of data contains a compilation of material pertinent to the expert's field of expertise. Non-limiting embodiments of versions of databases that can be included in the expert knowledge database may be research documents, LinkedIn portfolios, previous professional documents, ScienceDirect, JSTOR, Academic Search Complete, and the like. An "expert portal" as used herein, refers to a gateway where an expert may be recruited based on their area of expertise. A "portal" as used herein, systematically browses the world wide web to index the contents of a resource. In a non-limiting embodiment, an expert may interact with the portal to enter information, communicate with other experts, communicate with users, and the like. In a non-limiting embodiment, an expert may be recruited using a recruiting protocol. A "recruiting protocol" as used herein, refers to the systematic approach that is used to identify the specific hiring steps taken to hire an expert. In a non-limiting embodiment, a recruiting protocol may consist of a background investigation, interview sequence, mock teaching session, and the like. The term "gateway," refers to an application that stores information, data or other. The term "resource" refers to a stock of digital materials that may be drawn on by a user or organization in order to validate an expert's experience. In some embodiments, resource may include past experience, research, and the like. Resources can be drawn from the websites, internet portals, paper filings, and the like. The term "expert data" as used herein, refers to data pertaining to the Expert. In an embodiment, expert data may include material relevant to the expert's field of expertise. Expert data may include commentary and/or feedback from the expert. Expert data may include historical data which is collected data about past events and circumstances pertaining to the area of expertise. As used herein, "historical data" refers to data regarding past events and circumstances. As non-limiting examples, historical data may relate data regarding undergraduate degrees, graduate degrees, research projects, and the like. As used herein, "past events" refers to accomplishments or events that the expert has already completed. An example of an embodiment of an expert portal may be professional websites such as LinkedIn. This may also be an example of an embodiment of an expert knowledge data base. Within LinkedIn, viewers can locate many aspects about an expert's professional career as well as who they are connected with, where they studied, and the like. In another embodiment, expert data may be any work or research that an expert has conducted throughout their collegiate and professional careers. In a non-limiting embodiment, expert data 132 may be found by use of a web index which refers to a search for contents throughout the entirety of the internet by using keywords, queries and the like.

Still referring to FIG. 1, in a non-limiting embodiment, expert portal 128 may be used to allow communication between user 116 and expert 112. Communication may at least be in any form that is discussed in the disclosure. In an embodiment, expert portal 128 may have a separate section where expert 112 can input feedback regarding completion of a task to user 116. Expert portal 128 may also have a text messaging option, email option, chatroom option, and the like. Expert portal 128 may also have a messaging option that allows expert 112 to submit voice recordings or video recordings. Any communication between expert and user through the expert portal may be monitored and/or verified. User 116 may be able to reach out to expert 112 through use of the expert portal 128. Expert 112 may only be able to communicate with users who are actively working on tasks within the expert's field of expertise. Expert 112 may be able to communicate with other experts through expert portal 128.

Still referring to FIG. 1, information pertaining to expert data 132 may include the use of a query. As used herein, a "query" refers to a question about a specified subject. A query may include a web crawler function. A query may be configured to search for one or more keywords, key phrases, and the like. A keyword may be used by a query to filter potential results from a query. As a non-limiting example, a keyword may include "kinetics." A query may be configured to generate one or more key words and/or phrases as a function of plurality of expert data 132. A query may give a weight to one or more attributes of plurality of expert data 132. "Weights," as used herein, may be multipliers or other scalar numbers reflecting a relative importance of a particular attribute or value. A weight may include, but is not limited to, a numerical value corresponding to an importance of an element. In some embodiments, a weighted value may be referred to in terms of a whole number, such as 1, 100, and the like. As a non-limiting example, a weighted value of 0.2 may indicated that the weighted value makes up 20% of the total value. In some embodiments, a query may pair one or more weighted values to one or more attributes of plurality of expert data 132. Weighted values may be tuned through a machine-learning model, such as any machine learning model described throughout this disclosure, without limitation. In some embodiments, a query may generate weighted values based on prior queries. In some embodiments, a query may be configured to filter out one or more "stop words" that may not convey meaning, such as "of," "a," "an," "the," or the like.

Still referring to FIG. 1, a query may include a search index. A "search index" as used in this disclosure is a data structure that is configured to compare and/or match data. A search index may be used to link two or more data elements of a database. A search index may enable faster lookup times by linking similar data elements, such as attributes. In some embodiments, apparatus 100 and/or a query may generate an index classifier. In an embodiment, an index classifier may include a classifier. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. An index classifier may include a classifier configured to input attributes and output web search indices. A "web search index," as defined in this disclosure is a data structure that stores uniform resource locators (URLs) of web pages together with one or more associated data that may be used to retrieve URLs by querying the web search index; associated data may include keywords identified in pages associated with URLs by programs such as web crawlers and/or "spiders." A web search index may include any data structure for ordered storage and retrieval of data, which may be implemented as a hardware or software module. A web search index may be implemented, without limitation, as a relational database, a key-value retrieval datastore such as a NOSQL database, or any other format or structure for use as a datastore that a person skilled in the art would recognize as suitable upon review of the entirety of this disclosure. Data entries in a web search index may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a web search index may reflect categories, cohorts, and/or populations of data consistently with this disclosure. In an embodiment, a web search query at a search engine may be submitted as a query to a web search index, which may retrieve a list of URLs responsive to the query. In some embodiments, a computing device may be configured to generate a web search query based on a freshness and/or age of a query result. A freshness may include an accuracy of a query result. An age may include a metric of how outdated a query result may be. In some embodiments, a computing device may generate a web crawler configured to search the Internet for attributes such as, but not limited to, math skills, writing skills, technical knowledge, and the like.

Still referencing FIG. 1, processor 104 is configured to locate, as a function of expert portal 128, expert data 132 relating to the user 108. Expert data 132 may be located as a function of the user goal 120. In some cases, expert portal 128 may browse websites related to the user goal 120 of user 108. For example, expert portal 128 may only browse websites on financial literacy if user goal 120/apparatus 100 is related to financial literacy. In other cases, expert portal 128 may only browse websites on hardware/software design (i.e. stack overflow) if the user goal 120 has to do with software/hardware design/coding. For example, if the user goal data 116 contains code, the user goal 120 may be "software design". The expert portal 128 may use web crawling and/or spidering software to index and locate expert data 132 pertaining to an expert who has experience in software design. In an embodiment, expert portal 128 may search a list of "seed" websites found on a database communicatively connected to processor 104. As expert portal 128 visits these websites, it may "spider" to new websites through hyperlinks, and the like found on the seed websites. The new websites may be added to the database. The database may expand through each iteration of searches.

Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 1, an expert classification may be generated by the use of first machine-learning process 136. Processor 104 may perform determinations, classification, and/or analysis steps, methods, processes, or the like as described in this disclosure using machine learning process 136. A "machine learning process," as used in this disclosure, is a process that automatedly uses a body of data known as "training data" and/or a "training set" to generate an algorithm that will be performed by a computing device/module to produce outputs given data provided as inputs; this is in contrast to a non-machine learning software program where the commands to be executed are determined in advance by a user and written in a programming language. First machine-learning process 136 may generate a classifier using a classification algorithm, defined as a process whereby a computing device and/or any module and/or component operating thereon derives a classifier from training data. Classification may be performed using, without limitation, linear classifiers such as without limitation logistic regression and/or naive Bayes classifiers, nearest neighbor classifiers such as k-nearest neighbors' classifiers, support vector machines, least squares support vector machines, fisher's linear discriminant, quadratic classifiers, decision trees, boosted trees, random forest classifiers, learning vector quantization, and/or neural network-based classifiers. Within machine learning process 136 there may be an expert classifier 140. A "classifier," as used in this disclosure is a machine-learning model, such as a mathematical model, neural net, or program generated by a machine learning algorithm known as a "classification algorithm" that sorts inputs into categories or bins of data, outputting the categories or bins of data and/or labels associated therewith. A classifier may be configured to output at least a datum that labels or otherwise identifies a set of data that are clustered together, found to be close under a distance metric, or the like. In some embodiments, first machine learning process 136 may receive input from expert knowledge data 144 and expert classifier 140. System 100 may generate at least an expert template 156 as a function of first machine learning process 136. In some embodiments, system 100 may train first machine learning process 136. In some cases, training first machine learning process 136 may include inputting training data into a machine learning algorithm. Expert knowledge data 144 and expert knowledge database 124 may be used to train first machine learning algorithm. Expert knowledge data 144 may be used as training data for machine learning algorithm, such as expert classifier 140, because expert knowledge data 144 may indicate the field of an expert's expertise and may indicate the type of subjects they will be able to provide guidance on. The term "expert knowledge data" as used herein, refers to any information pertaining to the expert's knowledge of the specified material. There may be at least relevant subjects of expertise and expertise history gained from expert knowledge data 144.

For example, expert knowledge data 144 may include examples of prior courses that the expert may have taught, such as linear algebra. If user goal 120 is to learn algebra, first machine-learning process 136 may be able to identify expert 112 strengths in the field of higher-level mathematics. An expert may have a plurality of fields of expertise, but first machine-learning process 148 may only be able to identify areas of expertise associated with user goal 120. Alternatively, machine-learning model 148 may identify all areas of expertise associated with expert 112. Inputs to the machine-learning model may include expert data 132, expert knowledge data 144, user goal 120, and the like. An "input," as used herein, refers to data that is put into a process or system. An example of an input is text that is typed into a computer. The user is entering information into the computer's processor by inputting typed words into a search engine. Machine learning process 136 may be iterative such that outputs of the classification algorithm may be used as future inputs of the algorithm. This may allow the expert classifier 140 to evolve. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Further referencing FIG. 1, processor 104 may utilize a machine learning algorithm within first machine-learning process 136. A machine learning algorithm, such as a classifier, may output expert template 156. An "output" as used herein, refers to the product of the machine learning process. Expert knowledge data 144 and other expert data 132 may be inputted into first machine learning process 136, and expert template 156 may be the output. The term "expert template," as used herein, is a credential that contains relevant information regarding the expert's field of expertise. Expert template 156 may be used to match an expert 112 to a user 108. For instance, if a user wants to become better at mathematics, an expert may need to have substantial knowledge of various concentrations of mathematics, which could be displayed within an expert template. An expert template may use expert knowledge data 144 to condense expert 112 concentrations into more narrow facets that may make it easier to matchup with a user. Processor 104 may utilize a knowledge-based system (KBS) to classify an expert knowledge data 144 to an expert template 156. As used in this disclosure, a KBS is a computer program that reasons and uses a knowledge base to solve complex problems. A KBS may scrape websites to gain knowledge for the knowledge base. As used herein, a "knowledge base" is an established collection of information and resources. The KBS has two distinguishing features: a knowledge base and an inference engine. A knowledge base may include technology used to store complex structured and unstructured information used by a computer system, often in some form of subsumption ontology rather than implicitly embedded in procedural code. Other common approaches in addition to a subsumption ontology include frames, conceptual graphs, and logical assertions. In some embodiments, the knowledge base may be a storage hub that contains information about past matches of expert knowledge data 144 to expert template 156 based on the similarity of inputs and feedback from users and system administrators about the compatibility of matches. Next, an inference engine allows new knowledge to be inferred. For example, the inference engine may determine that an expert's system has expert knowledge data with attributes that demonstrate an expertise of math skills, the system may then infer that the expert 112 should be matched up with a user who has deficiency in math skills. In another example, the inference engine may infer a goal based on the user goal data 116. Inferences can take the form of IF-THEN rules coupled with forward chaining or backward chaining approaches. Forward chaining starts with the known facts and asserts new facts. Backward chaining starts with goals and works backward to determine what facts must be asserted so that the goals can be achieved. Other approaches include the use of automated theorem provers, logic programming, blackboard systems, and term rewriting systems such as CHR (Constraint Handling Rules). For example, following the IF-THEN rule format, the inference engine could devise "if user goal data 116 consists of an aptitude for musical talent, then a goal may include a proposed task of learning how to play a musical instrument." The inference engine may make predictions or decisions in optimizing user goal data 116 to user goal 120 without being explicitly programmed to do so. The inference engine may receive constant feedback and self-learn based on previous classifications, as described through this disclosure, and recommendations to further refine and strengthen its recommendations.

Continuing to reference FIG. 1, second machine learning model 148 may further include a machine learning algorithm, such as a scoring function. In a non-limiting embodiment, a scoring function may be used to determine an expert template 156. In an embodiment, an expert knowledge data 144 set may be scored to determine the field of expertise for expert 112. For example, expert knowledge data may be scored with a numerical integer between 1-10, wherein 10 means that the expert is very knowledgeable on the subject area and 1 is no knowledge about the subject area. In another embodiment, the scoring may be determined by survey data. For example, if expert gets a question on the survey correct, it may add points. The score may also be generated by self-ranking, which may be present in survey expert knowledge data 144, such that a user may rank themselves for their level of understanding for a particular question. For example, an expert may be asked to identify their expertise in musical rhythm as a rank between 1-10, 1 being the worst, and 10 being the best. In an embodiment, there may be a threshold score set by a user of apparatus 100, or by processor 104. A threshold score may be used to determine whether there are skills in the data set. For example, if the threshold score is set at 7, any completed task that score below a 7 may include deficiencies. Fuzzy set classification may also be used. A "fuzzy set" is a class of objects with a continuum of grades of membership. Such a set is characterized by a membership (characteristic) function which assigned to each object a grade of membership ranging between zero and one. Membership may include characteristics associated with expert knowledge data 144, such as expertise in understanding a user's goal or applied skill. Fuzzy data classification is discussed further in FIG. 5.

Still referencing FIG. 1, expert template 156 may be used as an input to second machine-learning process 148. Second machine-learning process 148 may be consistent with first machine-learning process 136. Second machine learning process 148 may use user goal 120 and expert template 156 as inputs coupled with a matching classifier 152. Matching classifier 152 may be used to generate an output of a match 160. Matching classifier 152 may be consistent with expert classifier 140. Matching classifier 152 may be utilized to parse through expert templates 156 and user goals 120 to match an expert with a user who wants to learn something within the expert's field description. Matching classifier may include training data. Training data may be data stemming from user goal 120 and expert template 156. Training data including User goal 120 and expert template 156 may indicate suitable matches between a user 108 and expert 112. Classifying commonalities between user goal 120 and expert template 156 may indicate a suitable match. The term "expert field description" as used herein, refers to an area of study that the expert has a broad and deep understanding of and competence in terms of knowledge, skill and experience through practice, education, and the like. As used herein, an "area of study" is a curriculum area under which course subjects can be grouped to define concentrations in the expert's program. Some non-limiting examples of areas of study are Mathematics, Physics, Spanish, Molecular Biology, and the like. The expert field description may provide a robust analysis of the expert's field of work, as well as years of experience, background of study, and the like. A "match" as used herein, refers to a coupling of an expert and a user based the user's learning goal and the expert's field of expertise. For instance, if a user has a goal of learning Spanish, the user may be matched with an expert who has taught upper-level Spanish courses, has studied the Spanish language in depth, and the like. Match 160 may generate a means of communication between expert 112 and user 108 where expert 112 may be able to provide input of guidance and goals for user 108 to view. Communication may manifest in forms of verbal, written, visual communication and the like so that any input is viewable to expert 112, user 108 and authorized third-party.

Figure 2:
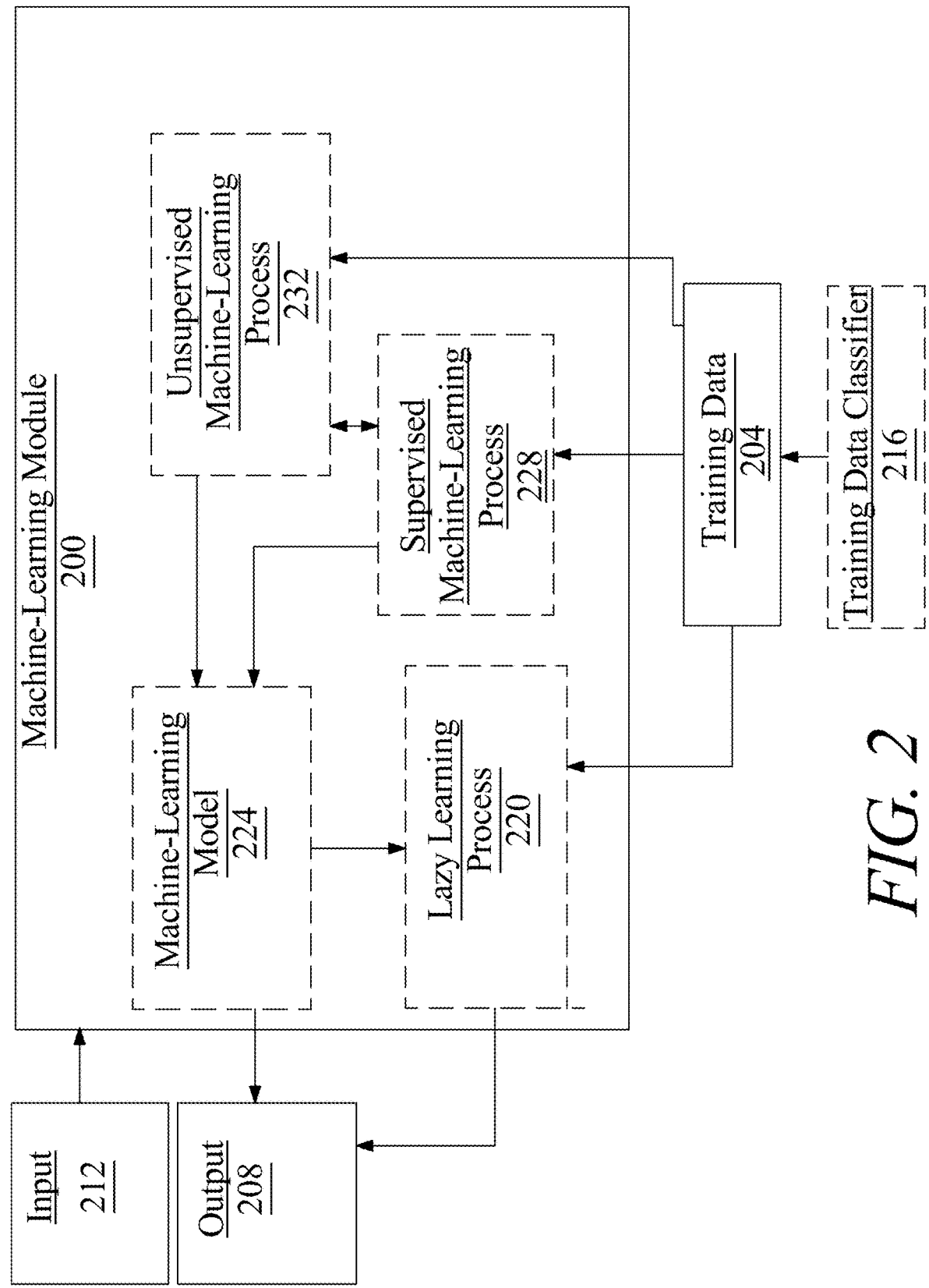
FIG. 2 a block diagram illustrating an exemplary model of a machine learning process.

Referring now to FIG. 2, an exemplary embodiment of a machine-learning module 200 that may perform one or more machine-learning processes as described in this disclosure is illustrated. Machine-learning module 200 may perform determinations, classification, and/or analysis steps, methods, processes, or the like as described in this disclosure using machine learning processes. A "machine learning process," as used in this disclosure, is a process that automatedly uses training data to generate an algorithm that will be performed by a computing device/module to produce outputs given data provided as inputs; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input 212 data as described in this disclosure to any output 208 data as described in this disclosure.

Further referring to FIG. 2, training data 204 may be filtered, sorted, and/or selected using one or more supervised and/or unsupervised machine-learning processes 222 and/or models as described in further detail below; such models may include without limitation a training data classifier 216. Training data classifier 216 may include a "classifier," which as used in this disclosure is a machine-learning model 224 as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output 208 at least a datum that labels or otherwise identifies a set of data that are clustered together, found to be close under a distance metric as described below, or the like. Machine-learning module 200 may generate a classifier using a classification algorithm, defined as a process whereby a computing device and/or any module and/or component operating thereon derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 2, machine-learning module 200 may be configured to perform a lazy-learning process and/or protocol, which may alternatively be referred to as a "lazy loading" or "call-when-needed" process and/or protocol, may be a process whereby machine learning is conducted upon receipt of an input 212 to be converted to an output 208, by combining the input 212 and training set to derive the algorithm to be used to produce the output 208 on demand. For instance, an initial set of simulations may be performed to cover an initial heuristic and/or "first guess" at an output and/or relationship. As a non-limiting example, an initial heuristic may include a ranking of associations between inputs and elements of training data. Heuristic may include selecting some number of highest-ranking associations and/or training data elements. Lazy learning 220 may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 2, machine-learning processes as described in this disclosure may be used to generate machine-learning models. A "machine-learning model," as used in this disclosure, is a mathematical and/or algorithmic representation of a relationship between inputs and outputs, as generated using any machine-learning process including without limitation any process as described above and stored in memory; an input 212 is submitted to a machine-learning model 224 once created, which generates an output 208 based on the relationship that was derived. For instance, and without limitation, a linear regression model, generated using a linear regression algorithm, may compute a linear combination of input 212 data using coefficients derived during machine-learning processes to calculate an output datum. As a further non-limiting example, a machine-learning model may be generated by creating an artificial neural network, such as a convolutional neural network comprising an input 212 layer of nodes, one or more intermediate layers, and an output 208 layer of nodes. Connections between nodes may be created via the process of "training" the network, in which elements from a training data 804 set are applied to the input 212 nodes, a suitable training algorithm (such as Levenberg-Marquardt, conjugate gradient, simulated annealing, or other algorithms) is then used to adjust the connections and weights between nodes in adjacent layers of the neural network to produce the desired values at the output 208 nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include subject-specific data as described above as inputs, description-specific data as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

Further referring to FIG. 2, machine learning processes may include at least an unsupervised machine-learning processes 232. An unsupervised machine-learning process 232, as used herein, is a process that derives inferences in datasets without regard to labels; as a result, an unsupervised machine-learning process 232 may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 3:
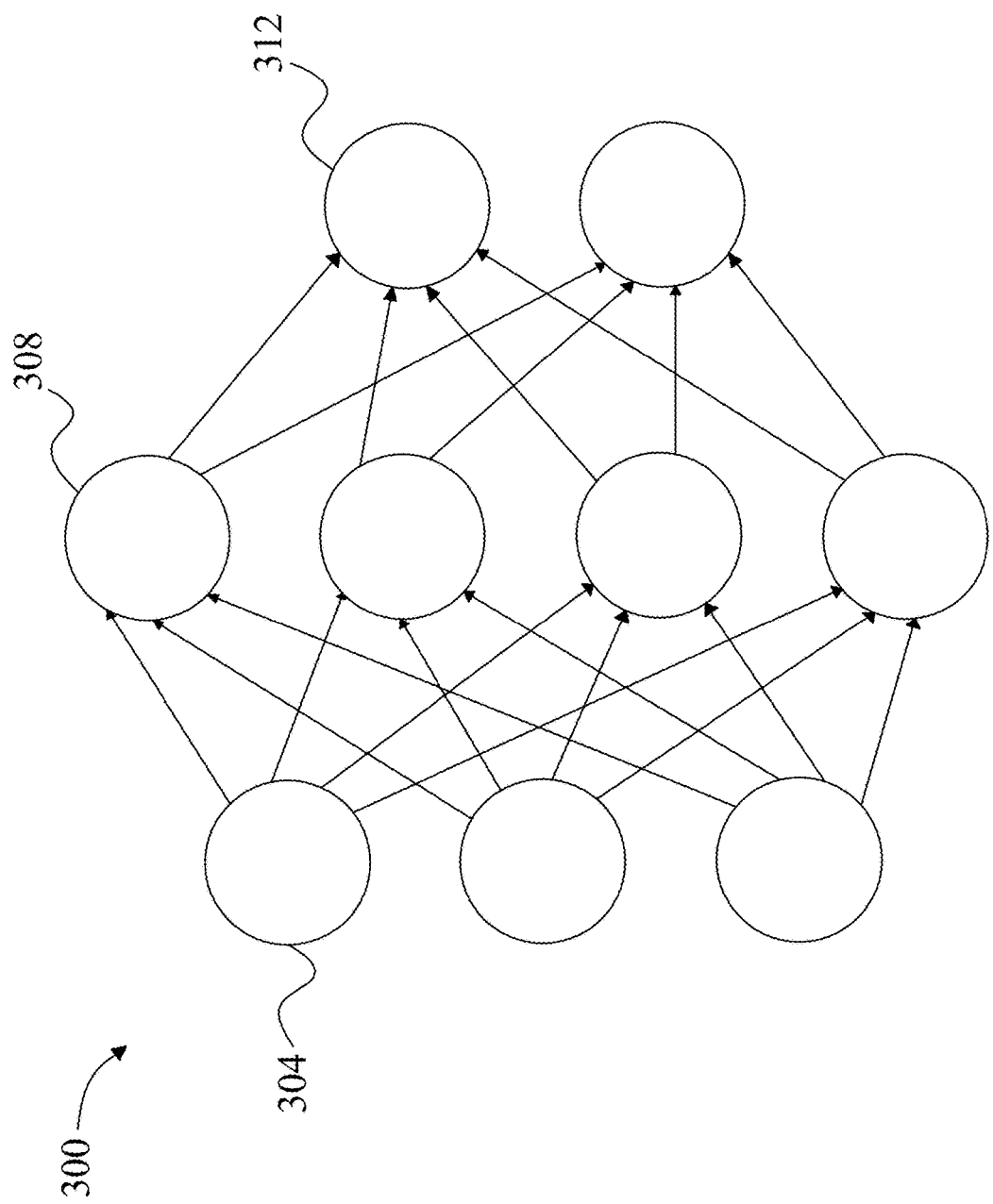
FIG. 3 is a diagram of an exemplary embodiment of neural network.

Referring now to FIG. 3, an exemplary embodiment of neural network 300 is illustrated. A neural network 300 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

Figure 4:
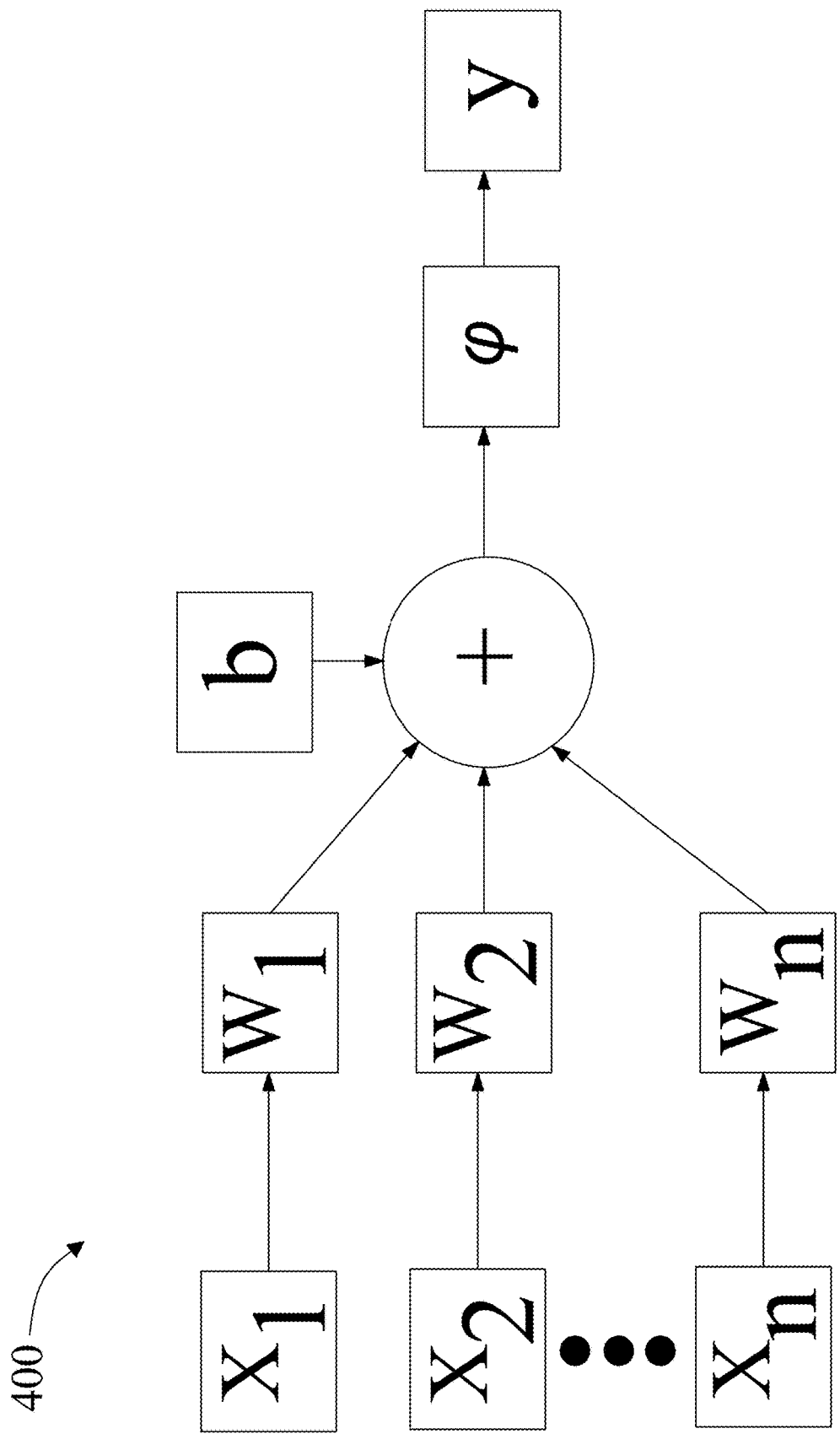
FIG. 4 is a diagram of an exemplary embodiment of a node of a neural network.

Referring now to FIG. 4, an exemplary embodiment of a node of a neural network is illustrated. A node may include, without limitation a plurality of inputs xi that may receive numerical values from inputs to a neural network containing the node and/or from other nodes. Node may perform a weighted sum of inputs using weights wi that are multiplied by respective inputs xi. Additionally, or alternatively, a bias b may be added to the weighted sum of the inputs such that an offset is added to each unit in the neural network layer that is independent of the input to the layer. The weighted sum may then be input into a function φ, which may generate one or more outputs y. Weight wi applied to an input xi may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights wi may be determined by training a neural network using training data, which may be performed using any suitable process as described above.

Figure 5:
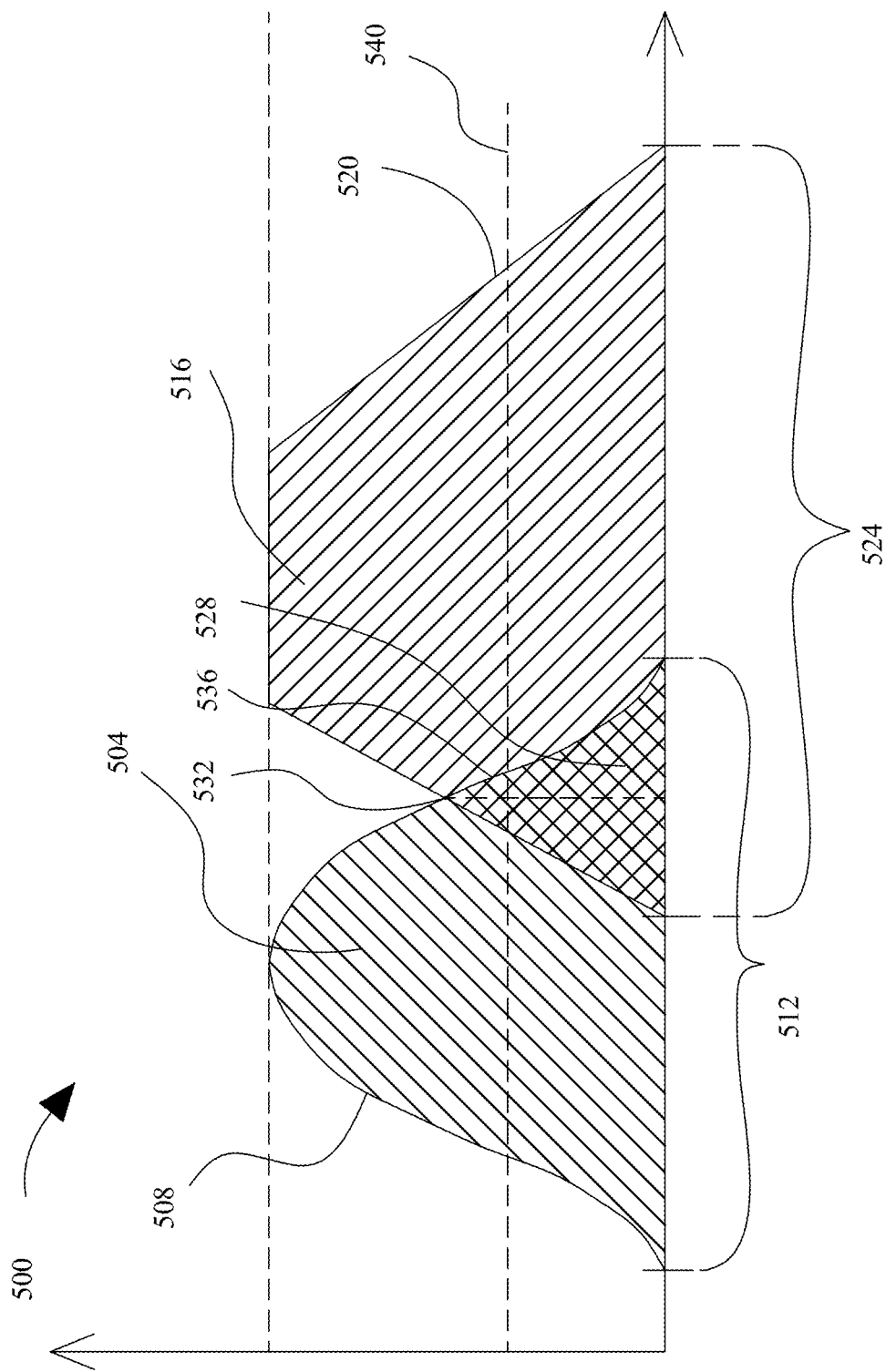
FIG. 5 is a graph illustrating an embodiment of fuzzy set comparison.

Referring to FIG. 5, an exemplary embodiment of fuzzy set comparison 500 is illustrated. A first fuzzy set 504 may be represented, without limitation, according to a first membership function 508 representing a probability that an input falling on a first range of values 512 is a member of the first fuzzy set 504, where the first membership function 508 has values on a range of probabilities such as without limitation the interval [0,1], and an area beneath the first membership function 508 may represent a set of values within first fuzzy set 504. Although first range of values 512 is illustrated for clarity in this exemplary depiction as a range on a single number line or axis, first range of values 512 may be defined on two or more dimensions, representing, for instance, a Cartesian product between a plurality of ranges, curves, axes, spaces, dimensions, or the like. First membership function 508 may include any suitable function mapping first range 512 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \leq x < b \\ \frac{c-x}{c-b}, \text{ if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 5, first fuzzy set 504 may represent any value or combination of values as described above, including output from one or more machine-learning models and expert data, a predetermined class, such as without limitation of expert knowledge data A second fuzzy set 516, which may represent any value which may be represented by first fuzzy set 504, may be defined by a second membership function 520 on a second range 524; second range 524 may be identical and/or overlap with first range 512 and/or may be combined with first range via Cartesian product or the like to generate a mapping permitting evaluation overlap of first fuzzy set 504 and second fuzzy set 516. Where first fuzzy set 504 and second fuzzy set 516 have a region 528 that overlaps, first membership function 508 and second membership function 520 may intersect at a point 552 representing a probability, as defined on probability interval, of a match between first fuzzy set 504 and second fuzzy set 516. Alternatively or additionally, a single value of first and/or second fuzzy set may be located at a locus 556 on first range 512 and/or second range 524, where a probability of membership may be taken by evaluation of first membership function 508 and/or second membership function 520 at that range point. A probability at 528 and/or 552 may be compared to a threshold 540 to determine whether a positive match is indicated. Threshold 540 may, in a non-limiting example, represent a degree of match between first fuzzy set 504 and second fuzzy set 516, and/or single values therein with each other or with either set, which is sufficient for purposes of the matching process; for instance, threshold may indicate a sufficient degree of overlap between an output from one or more machine-learning models and/or expert data and a predetermined class, such as without limitation expert knowledge data categorization, for combination to occur as described above. Alternatively or additionally, each threshold may be tuned by a machine-learning and/or statistical process, for instance and without limitation as described in further detail below.

Further referring to FIG. 5, in an embodiment, a degree of match between fuzzy sets may be used to classify an expert with expert knowledge data. For instance, if an expert knowledge data has a fuzzy set matching user goal fuzzy set by having a degree of overlap exceeding a threshold, computing device 104 may classify the expert data as belonging to the expert knowledge data categorization. Where multiple fuzzy matches are performed, degrees of match for each respective fuzzy set may be computed and aggregated through, for instance, addition, averaging, or the like, to determine an overall degree of match.

Still referring to FIG. 5, in an embodiment, an expert data may be compared to multiple expert knowledge data categorization fuzzy sets. For instance, expert data may be represented by a fuzzy set that is compared to each of the multiple expert knowledge data categorization fuzzy sets; and a degree of overlap exceeding a threshold between the expert data fuzzy set and any of the multiple expert knowledge data categorization fuzzy sets may cause processor 104 to classify the expert as belonging to expert knowledge data categorization. For instance, in one embodiment there may be two expert knowledge data categorization fuzzy sets, representing respectively expert knowledge data categorization and user goal knowledge data categorization. First expert knowledge data categorization may have a first fuzzy set; Second user goal categorization may have a second fuzzy set. Processor 104, for example, may compare an expert data fuzzy set with each of expert knowledge data categorization fuzzy set and inexpert knowledge data categorization fuzzy set, as described above, and classify an expert data to either, both, or neither of expert knowledge data categorization or inexpert knowledge data categorization. Machine-learning methods as described throughout may, in a non-limiting example, generate coefficients used in fuzzy set equations as described above, such as without limitation x, c, and σ of a Gaussian set as described above, as outputs of machine-learning methods. Likewise, expert data may be used indirectly to determine a fuzzy set, as expert data fuzzy set may be derived from outputs of one or more machine-learning models that take the expert data directly or indirectly as inputs.

Still referring to FIG. 5, a computing device may use a logic comparison program, such as, but not limited to, a fuzzy logic model to determine an expert knowledge data response. An expert knowledge data response may label as a score to include, but not limit, amateur, average, knowledgeable, superior, and the like; each such expert knowledge data response may be represented as a value for a linguistic variable representing expert knowledge data response or in other words a fuzzy set as described above that corresponds to a degree of completion, difficulty, compatibility, and the like as calculated using any statistical, machine-learning, or other method that may occur to a person skilled in the art upon reviewing the entirety of this disclosure. In other words, a given element of expert data may have a first non-zero value for membership in a first linguistic variable value such as "user goal" and a second non-zero value for membership in a second linguistic variable value such as "expert knowledge data" In some embodiments, determining an expert knowledge data categorization may include using a linear regression model. A linear regression model may include a machine learning model. A linear regression model may be configured to map data of expert data, such as time for completion to one or more expert knowledge data parameters. A linear regression model may be trained using a machine learning process. A linear regression model may map statistics such as, but not limited to, quality of expert data completion. In some embodiments, determining an expert knowledge data of expert data may include using an expert knowledge data classification model. An expert knowledge data model may be configured to input collected data and cluster data to a centroid based on, but not limited to, frequency of appearance, linguistic indicators of quality, and the like. Centroids may include scores assigned to them such that quality of completion of expert data may each be assigned a score. In some embodiments expert knowledge data model may include a K-means clustering model. In some embodiments, expert knowledge data model may include a particle swarm optimization model. In some embodiments, determining the expert knowledge data of an expert data may include using a fuzzy inference engine. A fuzzy inference engine may be configured to map one or more expert data elements using fuzzy logic. In some embodiments, expert data may be arranged by a logic comparison program into expert knowledge data arrangements. An "expert knowledge data arrangement" as used in this disclosure is any grouping of objects and/or data based on skill level and/or output score. This step may be implemented as described above in FIGS. 1-4. Membership function coefficients and/or constants as described above may be tuned according to classification and/or clustering algorithms. For instance, and without limitation, a clustering algorithm may determine a Gaussian or other distribution of questions about a centroid corresponding to a given [ . . . ] level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 5, an inference engine may be implemented according to input and/or output membership functions and/or linguistic variables. For instance, a first linguistic variable may represent a first measurable value pertaining to expert knowledge, such as a degree of certification within the field, while a second membership function may indicate a degree of inexpert knowledge data of a subject thereof, or another measurable value pertaining to expert data. Continuing the example, an output linguistic variable may represent, without limitation, a score value. An inference engine may combine rules, such as: "if the difficulty level is 'hard' and the popularity level is 'high', the question score is 'high'"—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity ($T(a, b)=T(b, a)$), monotonicity: ($T(a, b) \leq T(c, d)$ if $a \leq c$ and $b \leq d$), (associativity: $T(a, T(b, c))=T(T(a, b), c)$), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

Further referring to FIG. 5, expert data to be used may be selected by user selection, and/or by selection of a distribution of output scores, such as 50% hard/expert, 40% moderate average, and 50% easy/beginner levels or the like. Each expert knowledge data categorization may be selected using an additional function such as in expert knowledge data as described above.

Figure 6:
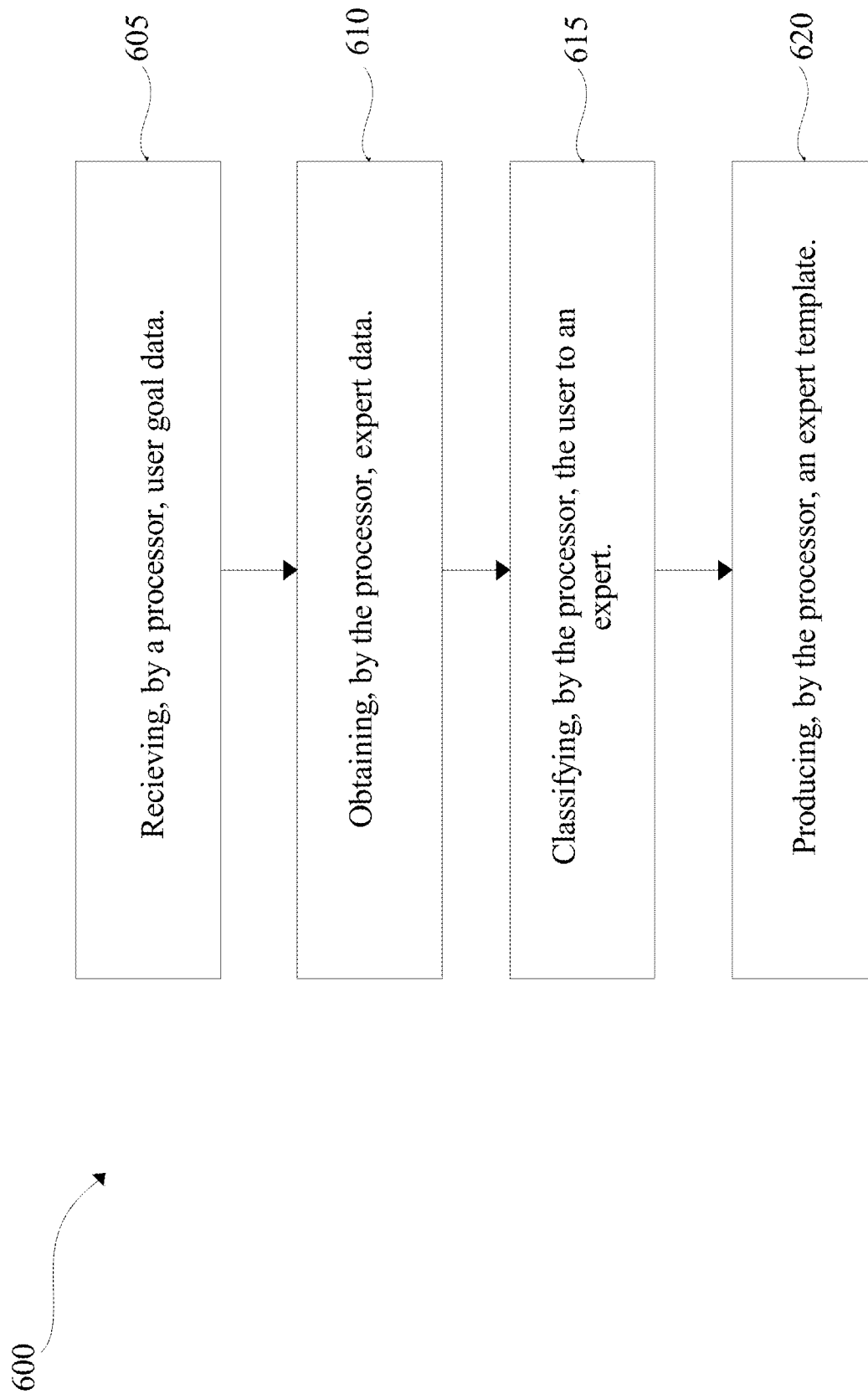
FIG. 6 is a flow diagram of a method of generating an expert template.

Now referencing FIG. 6, a flow diagram of method 600 for generating an expert template is shown. Step 605 of method 600 includes receiving, by a processor, user goal data relating to a user. A user goal data may be associated with tasks that a user has completed. User goal data may also be associated with user goals. This may be implemented as disclosed with references to FIGS. 1-5 above.

Step 610 of method 600 includes receiving, by a processor, expert data relating to an expert. Expert data may contain any information relating to the expert's field of expertise. This may be implemented as disclosed with references to FIGS. 1-5.

Step 615 of method 600 includes classifying, by a processor, the user to an expert as a function of the user goal data. The classification may be generated using a machine learning system. Within the machine learning system there may be an expert classification that categorizes facets of an expert's field of expertise in alignment with a potential user's goals. This may be implemented as disclosed with references to FIGS. 1-5.

Step 620 of method 600 includes generating, by a processor, an expert template. An expert template may include data that relates to the expert's experience in the field and the expert field description. This may be implemented as disclosed with references to FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
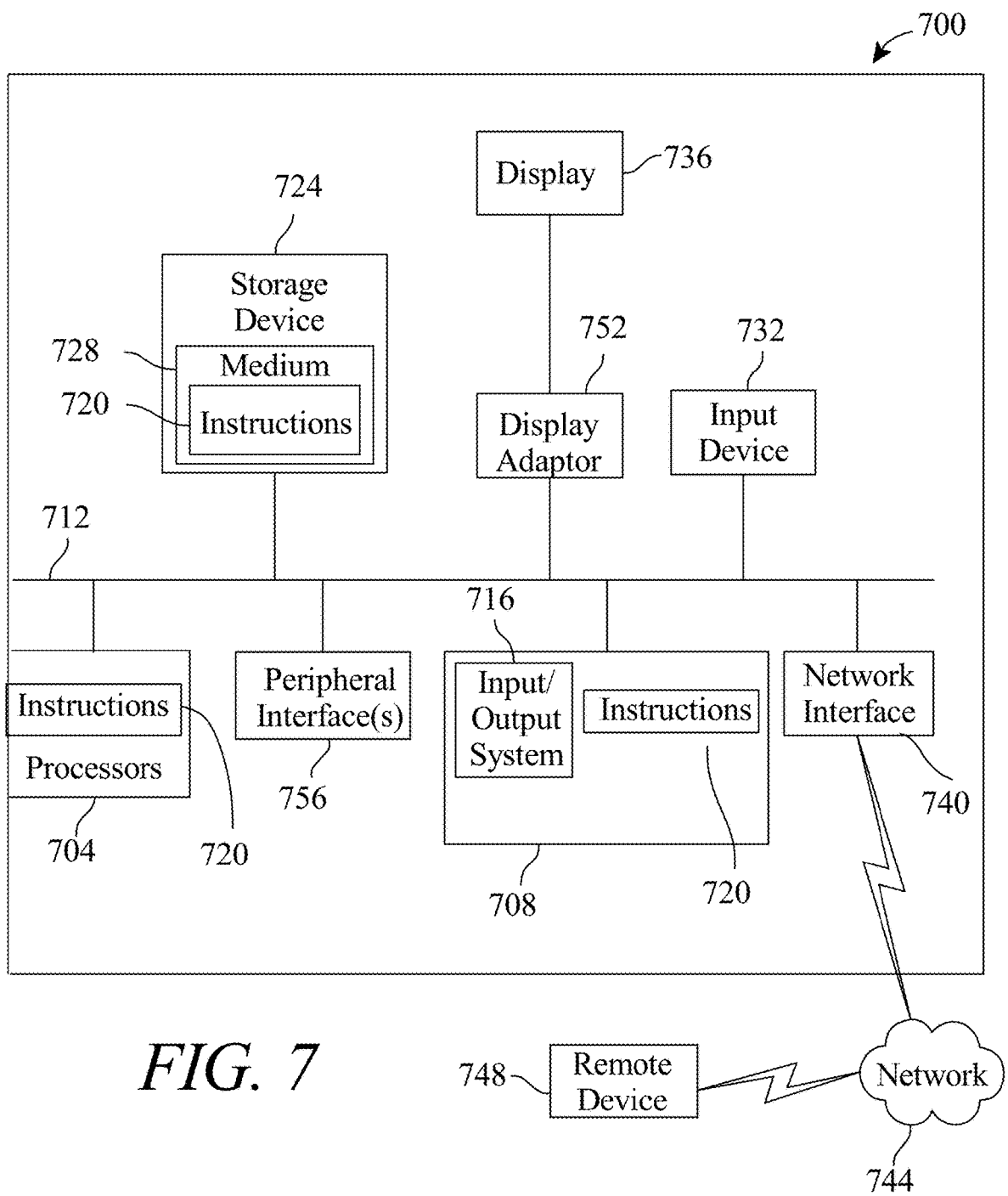
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generating an expert template, the apparatus comprising:
   at least a processor; and a memory communicatively connected to the at least a processor, the memory containing instructions configuring the at least a processor to:
receive user goal data relating to a user;
obtain expert data relating to an expert, wherein obtaining expert data comprises retrieving a plurality of expert data from at least a resource as a function of the user goal data, wherein retrieving the expert data comprises:
utilizing a web crawler to search a list of seed websites from an expert knowledge database;
spidering through each website of the list of seed websites through hyperlinks to find at least a new website to add to the expert knowledge database; and
adding the at least a new website to the expert knowledge database;
classify the user goal data to the expert, wherein classification of the user goal data to the expert further comprises:
iteratively training an expert classifier using training data which correlates expert knowledge data and the expert, including data generated by previous inputs and outputs by the expert classifier; and
classifying the user goal data set to the expert using the expert classifier;
produce an expert template; and
input the expert template to a matching classifier to obtain a match between the user and the expert, wherein obtaining a match further comprises:
iteratively training the matching classifier using training data with user goal and expert template as inputs to output a match between the user and the expert.

2. The apparatus of claim 1, wherein the user goal data comprises a goal relating to the user.

3. The apparatus of claim 1, wherein the user goal data comprises a task relating the user.

4. The apparatus of claim 1, wherein the expert data comprises historical data relating to the expert, including an expert field description.

5. The apparatus of claim 1, wherein obtaining expert data relating to an expert further comprises a recruiting protocol.

6. The apparatus of claim 5, wherein the recruiting protocol further comprises utilizing an expert portal.

7. The apparatus of claim 6, wherein the expert portal, operating on the processor, is configured to search for expert data on a resource relating to the received user goal data.

8. The apparatus of claim 6, wherein obtaining the expert data further comprises receiving expert data from the expert knowledge database, wherein the expert knowledge database is populated by the expert portal.

9. The apparatus of claim 1, wherein classifying the user to the expert comprises utilizing an expert machine learning model.

10. The apparatus of claim 1, wherein an expert portal, operating on the processor, is configured to transmit communication between the user and the expert.

11. A method for generating an expert template, the method comprising:
receiving, by a processor, user goal data relating to a user;
obtaining, by the processor, expert data relating to an expert, wherein receiving expert data comprises:
retrieving of expert data from at least a resource as a function of the user data relating to the user, wherein retrieving the expert data comprises:
utilizing a web crawler to search a list of seed websites from an expert knowledge database;
spidering through each website of the list of seed websites through hyperlinks to find at least a new website to add to the expert knowledge database; and
adding the at least a new website to the expert knowledge database;
classifying, by the processor, the user to the expert, using a machine learning process, wherein classification of the user to the expert further comprises:
iteratively training an expert classifier using training data which correlates expert knowledge data and the expert, including data generated by previous inputs and outputs by the expert classifier; and
classifying the user goal data set to the expert using the expert classifier;
producing an expert template; and
inputting the expert template to a matching classifier to obtain a match between the user and the expert, wherein obtaining a match further comprises:
iteratively training the matching classifier using training data with user goal and expert template as inputs to output a match between the user and the expert.

12. The method of claim 11, wherein the user goal data comprises a goal relating to the user.

13. The method of claim 11, wherein the user goal data comprises a task relating the user.

14. The method of claim 11, wherein the expert data comprises historical data relating to the expert, including an expert field description.

15. The method of claim 11, wherein obtaining expert data relating to an expert further comprises a recruiting protocol.

16. The method of claim 15, wherein the recruiting protocol further comprises utilizing an expert portal.

17. The method of claim 16, wherein the expert portal, operating on the processor, is configured to search for expert data on a resource relating to the received user goal data.

18. The method of claim 16, wherein obtaining the expert data further comprises receiving expert data from the expert knowledge database, wherein the expert knowledge database is populated by the expert portal.

19. The method of claim 11, wherein classifying the user to the expert comprises utilizing an expert machine learning model.

20. The method of claim 11, wherein an expert portal, operating on the processor, is configured to transmit communication between the user and the expert.

* * * * *